United States Patent
Wang et al.

(10) Patent No.: US 10,623,500 B2
(45) Date of Patent: Apr. 14, 2020

(54) REMOTE DESKTOP SHARING AND COLLABORATION VIA IMAGE SCANNING

(71) Applicant: VMware, Inc., Palo Alto, CA (US)

(72) Inventors: Dong Wang, Beijing (CN); Haiou Jiang, Palo Alto, CA (US); Yunfei San, Beijing (CN); Peng Guo, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 129 days.

(21) Appl. No.: 15/879,392

(22) Filed: Jan. 24, 2018

(65) Prior Publication Data

US 2019/0230165 A1    Jul. 25, 2019

(51) Int. Cl.

| | |
|---|---|
| *H04L 29/08* | (2006.01) |
| *G06F 9/451* | (2018.01) |
| *G06F 3/0481* | (2013.01) |
| *G06K 7/14* | (2006.01) |
| *H04L 12/24* | (2006.01) |
| *H04L 29/06* | (2006.01) |
| *H04W 12/00* | (2009.01) |

(52) U.S. Cl.
CPC .......... *H04L 67/141* (2013.01); *G06F 3/0481* (2013.01); *G06F 9/452* (2018.02); *G06K 7/1417* (2013.01); *H04L 41/22* (2013.01); *H04L 63/00* (2013.01); *H04L 63/0846* (2013.01); *H04L 65/403* (2013.01); *H04L 67/42* (2013.01); *H04L 63/0853* (2013.01); *H04W 12/00522* (2019.01)

(58) Field of Classification Search
CPC ..... G06F 3/0481; H04L 65/403; H04L 41/22; H04L 67/42

USPC ........................................................ 709/227
See application file for complete search history.

(56) References Cited

U.S. PATENT DOCUMENTS

| | | | |
|---|---|---|---|
| 6,801,576 B1 | 10/2004 | Haldeman | |
| 2010/0313199 A1* | 12/2010 | Chen ................... | G06F 9/5055 717/177 |
| 2011/0018963 A1* | 1/2011 | Robinson ............... | G06Q 10/00 348/14.16 |

(Continued)

OTHER PUBLICATIONS

Dong Wang, et al. "Redirecting Multimedia Captured on a Mobile Device to a Virtual Desktop Using Image Scanning", U.S. Appl. No. 15/653,692, filed Jul. 19, 2017.

(Continued)

*Primary Examiner* — Sm A Rahman
*Assistant Examiner* — Chen-Liang Huang

(57) ABSTRACT

Techniques are described for virtual desktop sharing and collaboration by utilizing image scanning and a web server. Upon launch, the virtual desktop client sets up a web server on the client computing device. During a virtual desktop session, the owner of the session provides input indicating that the session should be shared. A QR code is displayed on the client device which is encoded with information identifying the web server. When the QR code is scanned by a collaborator's mobile device, a web browser is launched on the mobile device and the web browser connects to the web server on the client computing device. The connection is used to transmit the request to access the virtual desktop session by the mobile device. If the session owner approves the request, the virtual desktop GUI data is streamed by the virtual desktop client to the mobile device over the HTTP connection.

20 Claims, 6 Drawing Sheets

(56) References Cited

U.S. PATENT DOCUMENTS

| | | |
|---|---|---|
| 2012/0326851 A1 | 12/2012 | Xu |
| 2013/0221083 A1 | 8/2013 | Doss |
| 2013/0225080 A1 | 8/2013 | Doss |
| 2013/0225081 A1 | 8/2013 | Doss |
| 2013/0262687 A1 | 10/2013 | Avery |
| 2014/0181256 A1 | 6/2014 | Trifa |
| 2014/0304322 A1* | 10/2014 | Dey .................. H04L 67/141 709/203 |
| 2015/0244812 A1 | 8/2015 | Brunson |
| 2016/0057135 A1 | 2/2016 | Jiang |
| 2016/0378782 A1 | 12/2016 | Jiang |
| 2017/0104797 A1 | 4/2017 | Venkatesh |
| 2017/0300189 A1 | 10/2017 | Pendergast |
| 2017/0351537 A1 | 12/2017 | AbiEzzi |
| 2018/0220189 A1* | 8/2018 | Hodge ................ G06Q 40/08 |
| 2019/0026121 A1 | 1/2019 | Dong |
| 2019/0026122 A1 | 1/2019 | Dong |
| 2019/0164165 A1* | 5/2019 | Ithabathula ...... G06Q 20/40145 |

OTHER PUBLICATIONS

Jong Wang, et al. "Redirecting Multimedia Output of a Virtual Desktop to a Mobile Device Using Image Scanning", U.S. Appl. No. 15/653,705, filed Jul. 19, 2017.

* cited by examiner

REMOTE DESKTOP SHARING AND COLLABORATION VIA IMAGE SCANNING

TECHNICAL FIELD

The present disclosure generally relates to virtual desktop infrastructure and more specifically to techniques for allowing multiple users to collaboratively access a virtual desktop session by using image scanning and by implementing a web server.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server that is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

In conventional virtual desktop technology, when an owner of a virtual desktop desired to collaborate on her virtual desktop with other users, for example to allow each collaborator to view the virtual desktop and to produce mouse or keyboard inputs on the desktop, some form of collaboration software would have to be installed on the virtual desktop. Some examples of such software are WebEx, available from Cisco WebEx, and GoToMeeting, available from Citrix Systems, Inc. Using such conventional collaboration software with virtual desktops often produced a less than ideal user experience since the user desiring to start or join a collaborative session needed to install additional software and launch it each time a collaborative session was initiated or joined. Such collaboration software is often expensive and did not always integrate well with virtual desktops.

More recently, there have been some advancements which allow a user to natively share their virtual desktop with others, provided that the virtual desktop supports a specific type of operating system, such as Microsoft Windows. However, these advancements still require all the users participating in the collaboration to install a virtual desktop client application on their device before the desktop could be shared and the installed virtual desktop client needs to support the same operating system. Downloading and installing a virtual desktop client typically requires that every user has an account set up to access the same virtual desktop system, which many users may not have. Moreover, if the user only wishes to join a collaboration session once or twice, the user may not wish to download and install a client application on their device or establish an account with the virtual desktop system. A more seemless and efficient approach is desirable for providing collaborative access to virtual desktops.

DETAILED DESCRIPTION

Figure 1:
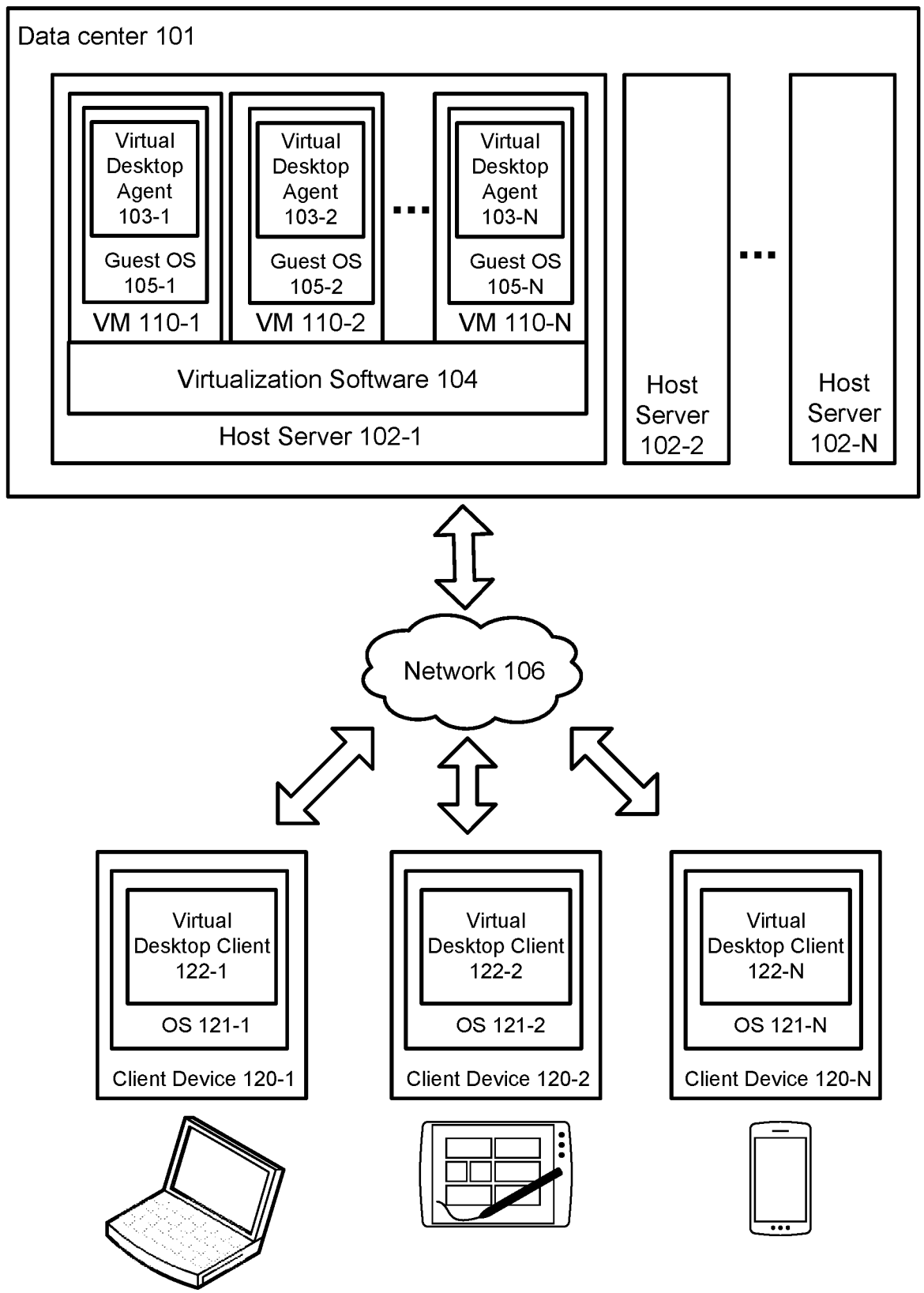
FIG. 1 illustrates an example of a virtual desktop environment, in accordance with various embodiments.

Systems and methods in accordance with various embodiments of the present disclosure overcome at least some of the above-mentioned shortcomings by providing more seemless and efficient virtual desktop sharing and collaboration. The virtual desktop sharing can be implemented by using image scanning in combination with a web server such that the users wishing to collaborate do not need to install a virtual desktop client application or set up an account with the virtual desktop system.

The process can begin by a primary user or "owner" of a virtual desktop logging into the virtual desktop session through a virtual desktop client application running on the owner's computing device. Once logged in, the owner may provide input indicating that the virtual desktop session should be shared with one or more other users. In response to detecting the input, the virtual desktop client application displays an image, such as a Quick Response (QR) code inside the virtual desktop graphical user interface (GUI). In one embodiment, the QR code is encoded with information (e.g., IP address) identifying a web server that is executing on the computing device of the virtual desktop owner. The web server is set up by the virtual desktop client application, for example, at a time when the virtual desktop client application is installed and/or launched on the owner's computing device.

Once the QR code (or similar encoded image) is displayed on the virtual desktop client, one or more other users (collaborators) may scan the QR code, for example by utilizing a digital camera of a mobile device, such as a smart phone, laptop or tablet computer. When the QR code is scanned, a web browser is launched on the mobile device and establishes a secured HTTP connection with the web server operating on the computing device of the desktop session owner. The web browser executes a web application provided by the web server, for sharing the virtual desktop session. In one embodiment, the web application running inside the web browser of the mobile device sends a request to access the virtual desktop session of the owner. The request includes information identifying the collaborator requesting access to the session, such as device information and/or user information.

When the request is received by the computing device of the virtual desktop session owner, the owner may approve the request to confirm that the requesting collaborator is permitted to access the virtual desktop session of the owner. For example, the owner may click on an "approve" button displayed on the GUI of the computing device along with the identifying information about the collaborator. When the owner approves the request, the collaboration session is established and the graphical user interface (GUI) information of the virtual desktop session begins to be streamed from the virtual desktop client to the mobile device over the HTTP connection. The virtual desktop GUI continues to be displayed on the owner's computing device, while simultaneously being displayed on the mobile device of the collaborator. In addition, if the owner wishes to grant control to the collaborator's device, any input data, such as mouse, keyboard and touch input events captured on the collaborator's mobile device can be streamed to the virtual desktop client operating on the owner's device. The virtual desktop client can in turn transmit the input data to the virtual desktop on the remote server, to be provided to the guest operating system of the virtual desktop. Any graphical user interface updates caused by the input are transmitted from the virtual desktop on the server to the virtual desktop client operating on the owner's device and then forwarded to the mobile device's web browser in order to continue the collaboration session.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
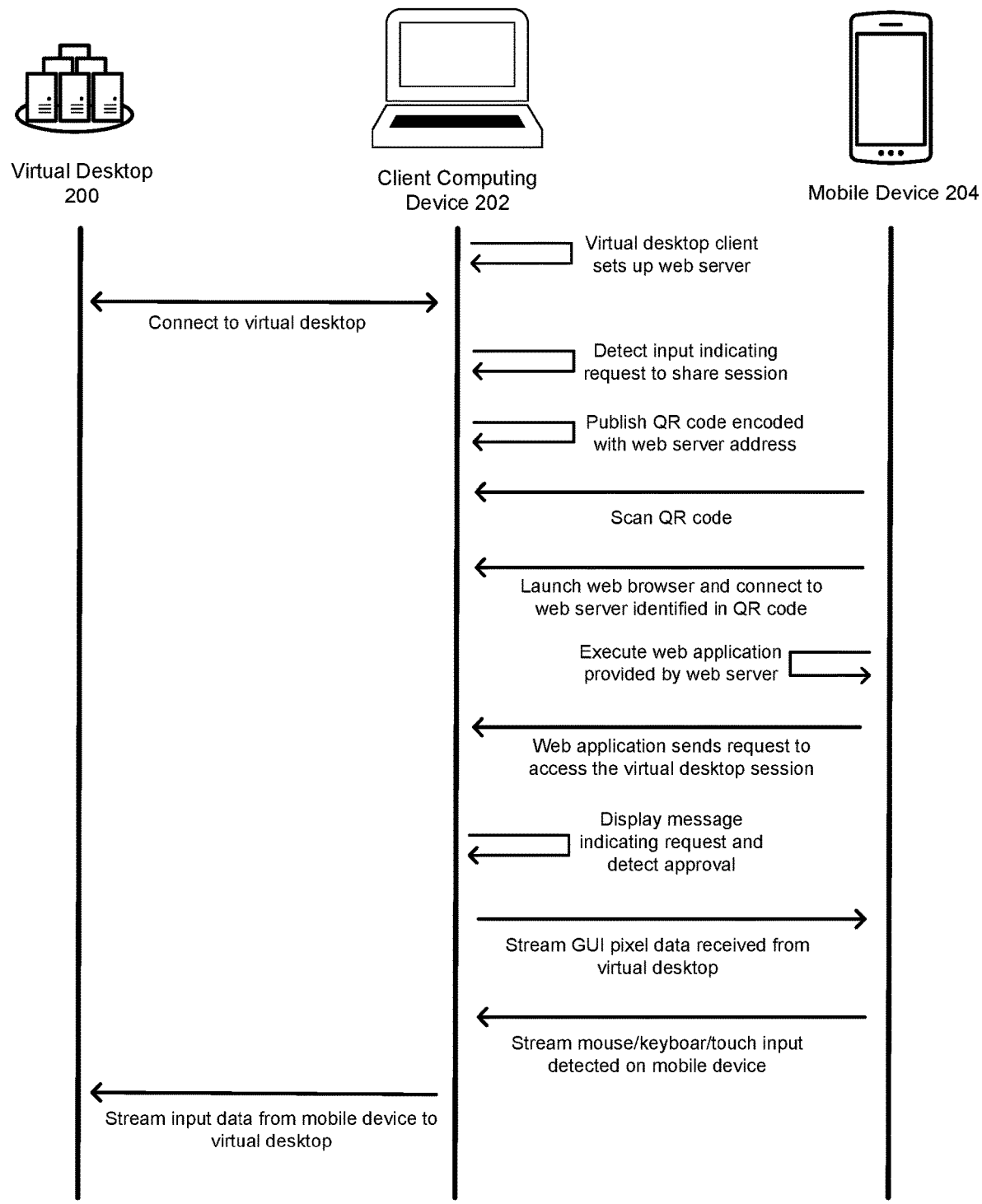
FIG. 2 illustrates an example of communications flow between the virtual desktop, the session owner's computing device and a collaborator's mobile device, in accordance with various embodiments.

FIG. 2 illustrates an example of communications flow between the virtual desktop, the session owner's computing device and a collaborator's mobile device, in accordance with various embodiments. The client computing device 202 can be any computing device having a virtual desktop client application installed thereon. In one embodiment, the client computing device 202 is the session owner's personal computer or laptop, however in alternative embodiments, the client computing device may be a smartphone or tablet computer or any other device capable of having a virtual desktop client application installed thereon.

In various embodiments, the virtual desktop client application is downloaded and installed on client computing device 202. As shown in the figure, when the virtual desktop client application is launched, the virtual desktop client application sets up a web server on the computing device 202 that will be used for virtual desktop collaboration. The web server is configured to host a web application that can be executed on a collaborator's device to enable collaboration virtual desktop sessions.

Before the virtual desktop session can be shared, the virtual desktop client application on the computing device 202 needs to connect to the virtual desktop 200. Once the connection is made, the virtual desktop client on the computing device 202 can accept input to share the virtual desktop session. In one embodiment, a user interface (UI) widget for desktop sharing is displayed to the user (owner of the virtual desktop session) in the GUI of the virtual desktop. When the owner clicks on the UI widget indicating that the virtual desktop session should be shared, a QR code (or other encoded image) is displayed on the display screen of the computing device 202 (e.g. shown in a popup dialog box). The QR code is encoded with information identifying the web server (e.g. IP address of the web server) established by the virtual desktop client on the computing device 202.

Once the QR code is displayed, any mobile device of collaborators in proximity of the computing device 202 may be used to scan the QR code and request access to the virtual desktop session. As shown in the illustration, the mobile device 204 is used to scan the QR code. The mobile device 204 may be any computing device that is equipped with a digital camera and QR scanning software, as well as capable of accessing the Internet. QR codes will be described in further detail with reference to FIG. 3. Scanning the QR code causes a web browser to be launched on the mobile device 204. The web browser on the mobile device 204 connects to the web server operating on the computing device 202 and executes the web application provided by the web server. The web application operating on the mobile device 204 then sends a request to the web server to access the virtual desktop session.

When the request is received by the computing device 202, a message is displayed in the GUI, indicating that the mobile device 204 is requesting access to the virtual desktop session. For example, the message may display identifying information of the mobile device 202 and/or collaborator user and may also display an "Approve" and "Deny" buttons to enable the owner of the desktop session to approve or reject the request.

If the session owner approves the request, the virtual desktop client application on the computing device 202 begins streaming the virtual desktop GUI data to the mobile device over a web connection (e.g. WebSocket) established between the web browser of the mobile device 204 and the web server operating on the computing device 202. The virtual desktop GUI data is the pixel data received from the virtual desktop 200 as part of the virtual desktop session established by the virtual desktop client. Streaming the GUI data enables the mobile device 204 to display the same virtual desktop session being accessed by the computing device 202. In one embodiment, the virtual desktop client on the computing device 202 also begins streaming the audio playback data of the virtual desktop to the mobile device 204. This effectively establishes the collaboration session between the computing device 202 and the mobile device 204. During this collaboration session, the web application executing on the mobile device 204 draws the virtual desktop screen updates and plays the audio stream received from the computing device 202. In some alternative embodiments, the session owner can be given the option to select sharing only the virtual desktop screen or only the desktop audio out stream or both and the data is streamed to the mobile device accordingly.

Additionally, the web application captures input data on the mobile device 204, such as mouse/keyboard/touch input events and streams the input data to the computing device 202. If the session owner transfers control of the virtual desktop session to the mobile device 204, the input captured on the mobile device 204 will also begin to be streamed to the virtual desktop 200 from the computing device 202. The input data is then provided to the guest operating system of the virtual desktop as local inputs. The inputs cause updates to the GUI of the virtual desktop and these updates are streamed back to the computing device 202 and then forwarded to the mobile device 204. In various embodiments, the session owner is able to revoke control granted to the mobile device 204 at any time, at which point the computing device 202 discontinues sending the input data captured on the mobile device 204 to the virtual desktop 200.

In this manner, both the computing device 202 and the mobile device 204 are able to view the virtual desktop session and take turns controlling the session, all without the need to install any virtual desktop client application or other software on the collaborator's mobile device. Either device can also terminate the collaboration session at any time. In various embodiments, more than one device can join the collaboration session in the manner described above, as well as be granted or revoked control of the desktop session.

Figure 3:
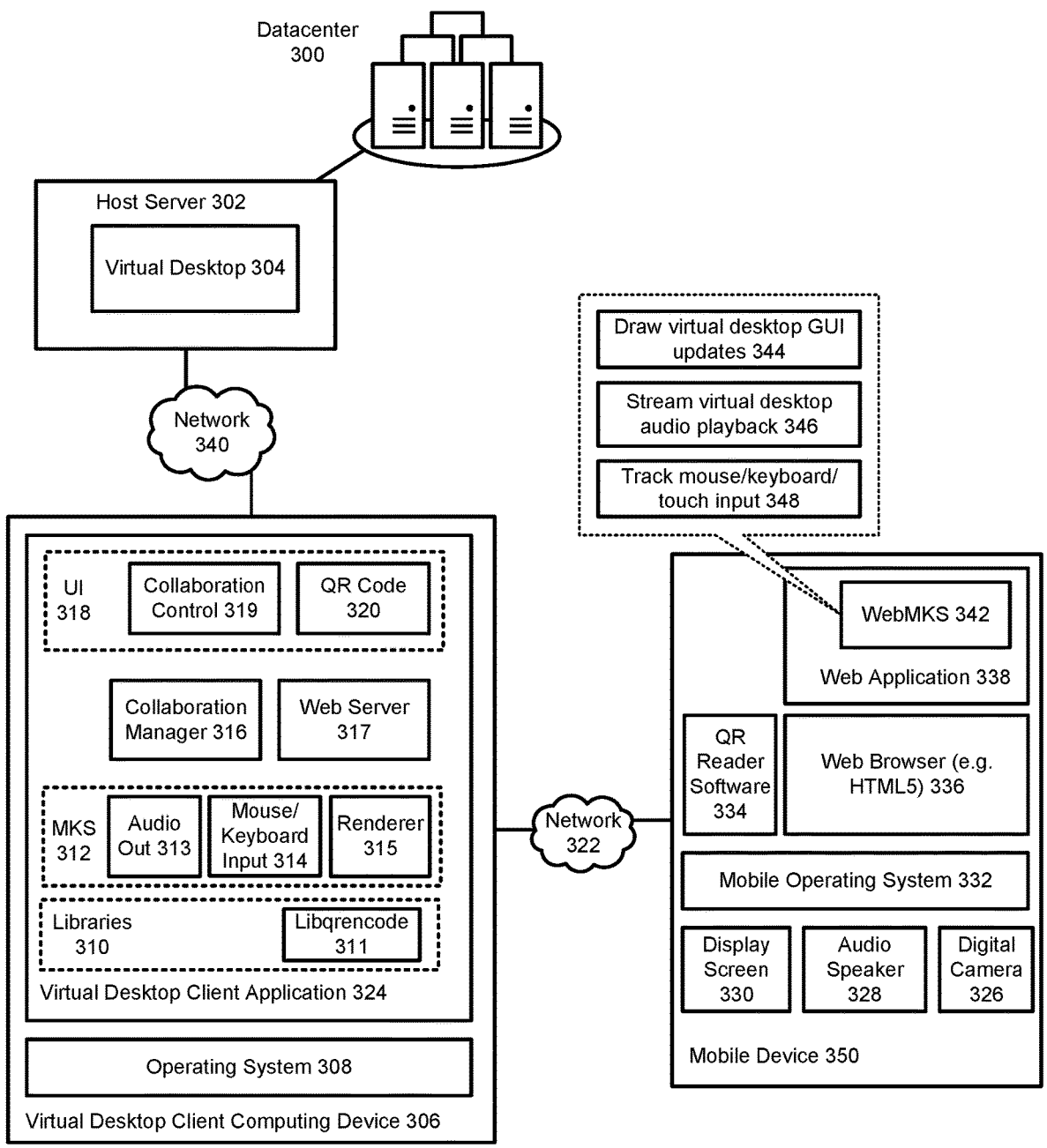
FIG. 3 illustrates the components on the client computing device and the mobile device that enable virtual desktop sharing, in accordance with various embodiments.

FIG. 3 illustrates the components on the client computing device and the mobile device that enable virtual desktop sharing, in accordance with various embodiments. As illustrated, the virtual desktop client computing device 306 can be any computing device capable of executing a virtual desktop client application 324. In the illustrated embodiment, the virtual desktop client device 306 is a computer having an operating system 308, such as Microsoft Windows, Linux, iOS, Android or other. A user may start the virtual desktop client application 324 to connect to their virtual desktop 304 running on a remote host server 302 (housed in a data center 300) using a network connection 340.

When the virtual desktop client application 324 starts up, it also sets up a web server 317 which is configured to provide the web application 338 used for enabling collaboration for the virtual desktop session. The web server 317 may be a module developed using NodeJS and provides an HTTPS service for any collaborator devices. The web server 317 receives video and audio streams coming from the MKS module 312 and streams them to the mobile device 350 (as well as any other collaborator devices if they have been approved by the session owner). Similarly, the web server 317 receives the mouse/keyboard/touch input events captured on the mobile device and sends this input data to the MKS module 312.

In various embodiments, the virtual desktop client application 324 includes the Mouse/Keyboard/Screen (MKS) module 312, which enables the computing device 306 to render the screen of the virtual desktop, play the audio out stream received from the virtual desktop and capture mouse and keyboard input to be sent to the virtual desktop 304. Conventionally, the MKS of a virtual desktop client would only render the virtual desktop GUI updates on the local device. Similarly, MKS conventionally would only track user's input on the local device. In this illustration however, to enable virtual desktop sharing and collaboration, the MKS module 312 is further configured to communicate with the collaboration manager 316. More particularly, the Audio Out 313 of the MKS module 312 is modified by adding an interface to stream a duplicate copy of the audio out stream (received from the virtual desktop) to the collaboration manager 316 in addition to locally playing the audio out stream on the computing device 306. The collaboration manager 316 in turn sends the duplicate audio out stream to the web server, to be transmitted to the mobile device 350 over the established WebSocket. In addition, the mouse/keyboard input 314 of the MKS module 312 is modified to accept input data from the collaboration manager 316, which the collaboration manager receives from the mobile device over the web server 317. More specifically, the collaborator's input is captured on the mobile device by the WebMKS module 342 (as described below) and the WebMKS module 342 streams those input events to the web server 317 via the Web Socket. The web server 317 delivers these events to the collaboration manager 316, which in turn provides the input data to the MKS module 312. Finally, the Renderer 315 of the MKS module 312 is also modified by adding an interface to communicate with the collaboration manager 316. The virtual desktop GUI updates received from the virtual desktop 304 are duplicated and streamed to the mobile device 350 by way of the collaboration manager 316 and the web server 317.

Once the virtual desktop client application 324 connects to the virtual desktop, the owner of the desktop session is able to provide input indicating that the session can be shared with one or more collaborators. For example, the user may click on the "Share This Desktop Session" button displayed by the virtual desktop client application 324 on the computing device 306. When such input is detected, the QR software (e.g. libqrencode 311) on the virtual desktop client device 306 generates a QR code 320 having information identifying the web server 317 and displays the QR code 320 on the user interface (UI) 318 of the virtual desktop.

A QR code is a type of well-known and widely available matrix barcode (or two-dimensional barcode) which is often used for product tracking or item identification. In most use cases, QR codes are used as machine-readable optical labels that contain information about the item to which they are attached. The QR code encodes data into an image which can be read by another machine. In various embodiments described herein, the QR code can be used to transmit data from one device to another. In the illustrated embodiment, the QR code can be displayed on the display screen of a client device 306 (e.g., a PC, laptop, etc.) and be encoded with information that identifies the web server 317 operating on the virtual desktop client device 306.

QR codes can generally be encoded with many different types of information. By way of example for purposes of this disclosure, the QR code may be encoded with a unique device identifier (ID), Internet Protocol (IP) address and one-time use token, among other types of information. In the illustrated embodiment, the QR code 320 is encoded with the IP address of the web server 317 by the virtual desktop client device 306 using QR software, which can be implemented using any freely available QR code generator software, such as libqrencode 311. In some embodiments, the QR software may be integrated and provided to the client device 306 along with the virtual desktop client application 324.

The output of the QR encoder library may be RGB data. To simplify the implementation, a bitmap object can be constructed with the output and a picture of it may be drawn using win32 APIs. The content encoded in the QR code may be formatted in the following manner: "https://10.112.119.95:8057" where 10.112.119.95 is the IP address of the virtual desktop client device 306 and 8057 is the specified port of the web server 317. In some embodiments, the QR code 320 may also include a one-time use token for security purposes. In these embodiments, besides the server address, the QR code 320 may contain a random string as a token for a session. If session sharing is successfully set up, the token will expire, i.e. become unavailable for future connections.

Once displayed, the QR code may be scanned using a digital camera 326 of a mobile device 350. For example, the user may launch a QR reader application that displays the live camera view of the mobile device 350 and aim the camera 326 of the mobile device 350 at the QR code 320 in order to place the QR code 320 within the field of view (FOV) of the digital camera 326 and to enable the mobile device to scan the QR code 320. The mobile device 130 may contain QR reader software 334 to scan the QR code 320 and to decode the information encoded therein. One example of such a QR code reader software 334 is ZBar which is a C barcode reading library with C++, Python, Perl, and Ruby bindings.

As previously mentioned, the mobile device 350 may be any device equipped with a multimedia accessory, such as a digital camera 326, audio speaker 328 and display screen 330. In some embodiments, the mobile device 350 may be within certain threshold physical vicinity of the virtual desktop computing device 306. In other embodiments, the proximity of the mobile device 350 is not important and the mobile device 350 may be located anywhere if it is capable of establishing a network connection. In some embodiments, the mobile device 350 may be located on the same subnet as the virtual desktop client device 306. In other embodiments, the devices may be located on different subnets.

In the illustrated embodiment, the mobile device 350 includes a mobile operating system (OS) 332 (e.g. iOS, Android, etc.) and supporting an HTML5 web browser 336. When the user uses the mobile device 350 to scan the QR code 320 displayed on the virtual desktop client device 306, the web browser 336 is launched. The web browser 336 of the mobile device 350 connects to the web server 317 over the network connection 322 (e.g., WebSocket connection) and runs the web application 338 inside the web browser 336 on the mobile device. The web application 338 is configured to establish the collaboration session. To do this, the web application 338 transmits a request to the web server 317, requesting to access the virtual desktop session.

In one embodiment, a core component of the web application 338 is the Web Mouse/Keyboard/Screen (WebMKS)

module 342. The WebMKS module 342 is configured to draw virtual desktop GUI updates 344 as well as play the virtual desktop audio out stream 346, both of which are streamed to it by the computing device via the Web Socket connection. In addition, the WebMKS 342 is configured to capture any mouse/keyboard/touch input 348 that is entered on the mobile device 350 and stream the input to the computing device 306.

Once the request to share the session is received from the mobile device 350 to the client computing device 306, the collaboration manager displays a message indicating the identifying information about the mobile device 350 and its user. In one embodiment, the collaboration manager 316 uses a collaboration control 319 portion of the user interface 318 in order to display the information. For example, when the request is received, a popup dialog box may be launched on the computing device 306, showing the name of the user of the mobile device 350, along with other identifying information. The owner of the session (the user of the virtual desktop client computing device 306) can then approve or deny the request by using the collaboration control 319.

In various embodiments, the collaboration manager 316 connects the UI 318, the MKS module 312 and the web server 317 to enable virtual desktop sharing and collaboration. For the UI 318, the collaboration manager 316 provides the current collaboration session information, which enables the owner of the session to know who is joined in the session and who is entitled to control input. At the same time, the collaboration manager 316 accepts user's configuration input from the UI 318, such as disable/enable input from a particular collaborator, as well as accept/deny collaboration requests. For the MKS module 312, the collaboration manager 316 receives the virtual desktop GUI updates and audio out data from the MKS module 312 and streams it to the mobile device 350 by way of the web server 317. The collaboration manager 316 also receives input captured on any collaborator devices (such as mobile device 350) and treats them according to the session owner's setting: if input control has been delegated to one or more collaborators, the collaboration manager 316 delivers the input events from those collaborators to the MKS module 312, otherwise the inputs are ignored.

Figure 4A:
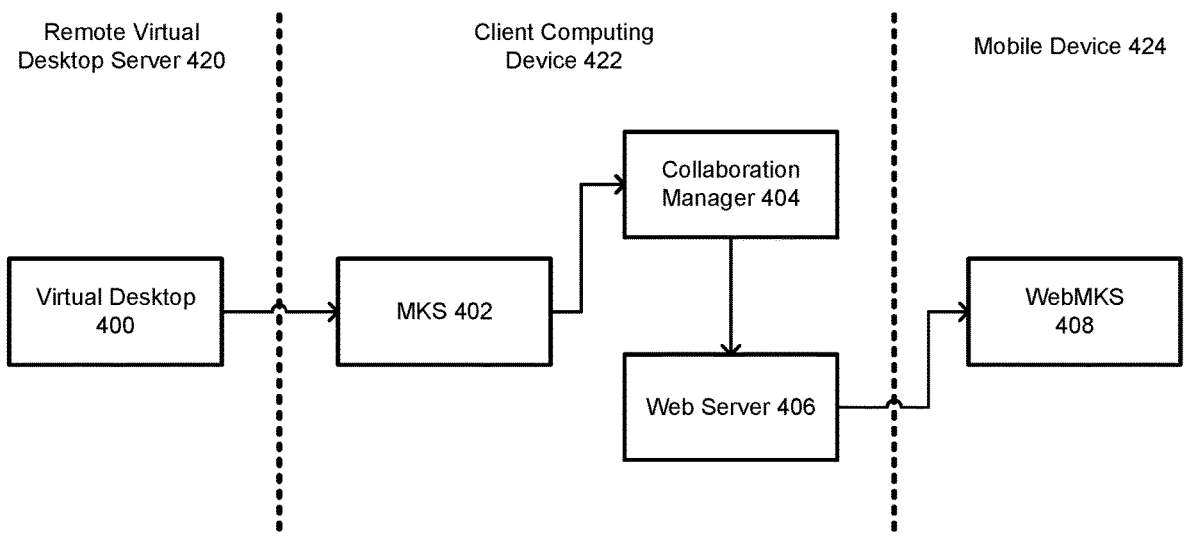
FIG. 4A illustrates an example of the virtual desktop GUI data being transmitted during a collaboration session, in accordance with various embodiments.

FIG. 4A illustrates an example of the virtual desktop GUI data being transmitted during a collaboration session, in accordance with various embodiments. As shown in this illustration, the virtual desktop GUI data is generated on the remote virtual desktop server 420. In one embodiment, the virtual desktop GUI data is the framebuffer pixel data that is generated by the guest operating system on a virtual machine on the server. The GUI data is then transmitted from the virtual desktop 400 to the MKS module 402 on the client computing device 422. The MKS module 402 sends the virtual desktop GUI data to the collaboration manager 404 and the collaboration manager sends the GUI data to the web server 406. Each of the MKS module 402, the collaboration manager 404 and the web server 406 reside on the client computing device 422. The web server 406 then transmits the GUI data over the network to the WebMKS module 408 residing on the mobile device 424 to be displayed thereon.

Figure 4B:
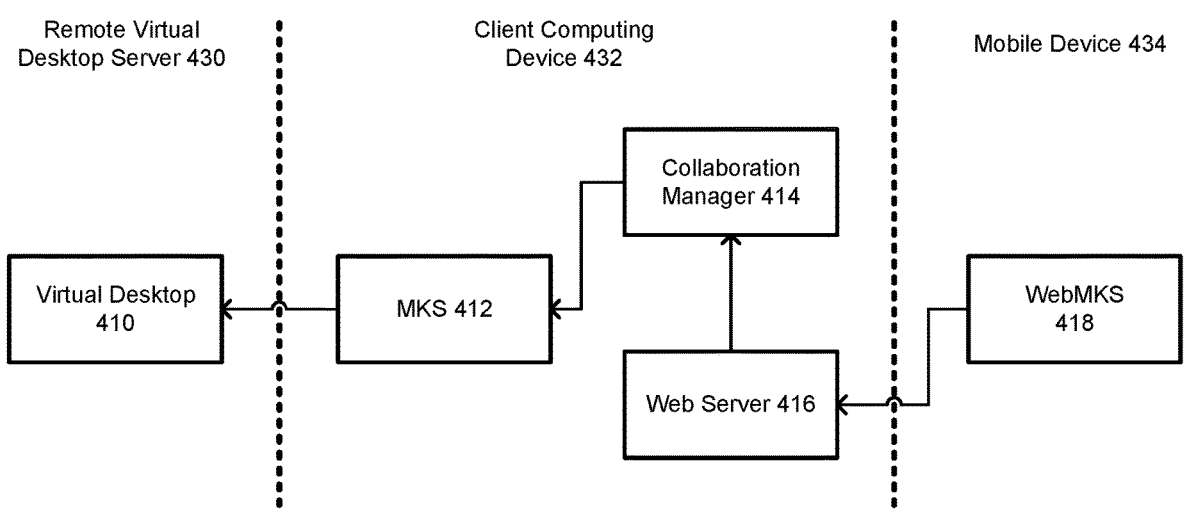
FIG. 4B illustrates an example of the input data that may be transmitted during a collaboration session, in accordance with various embodiments.

FIG. 4B illustrates an example of the input data that may be transmitted during a collaboration session, in accordance with various embodiments. In this particular example, it is assumed that input control has been granted to the mobile device 434 during the collaboration session. As shown, the input data (mouse/keyboard/touch input events) are captured on the mobile device by the WebMKS module 418. The WebMKS module 418 transmits the input data over the network to the web server 416 operating on the client computing device 432. The web server 416 relays the input data to the collaboration manager 414 and the collaboration manager 414 sends the input data to the MKS module 412, provided that the collaboration manager determines that the mobile device 434 has been granted input control in the collaboration session. The MKS module 412 then transmits the input data over the network to the virtual desktop 410 on the remote server 430 as though the inputs were entered on the client computing device 432.

Figure 5:
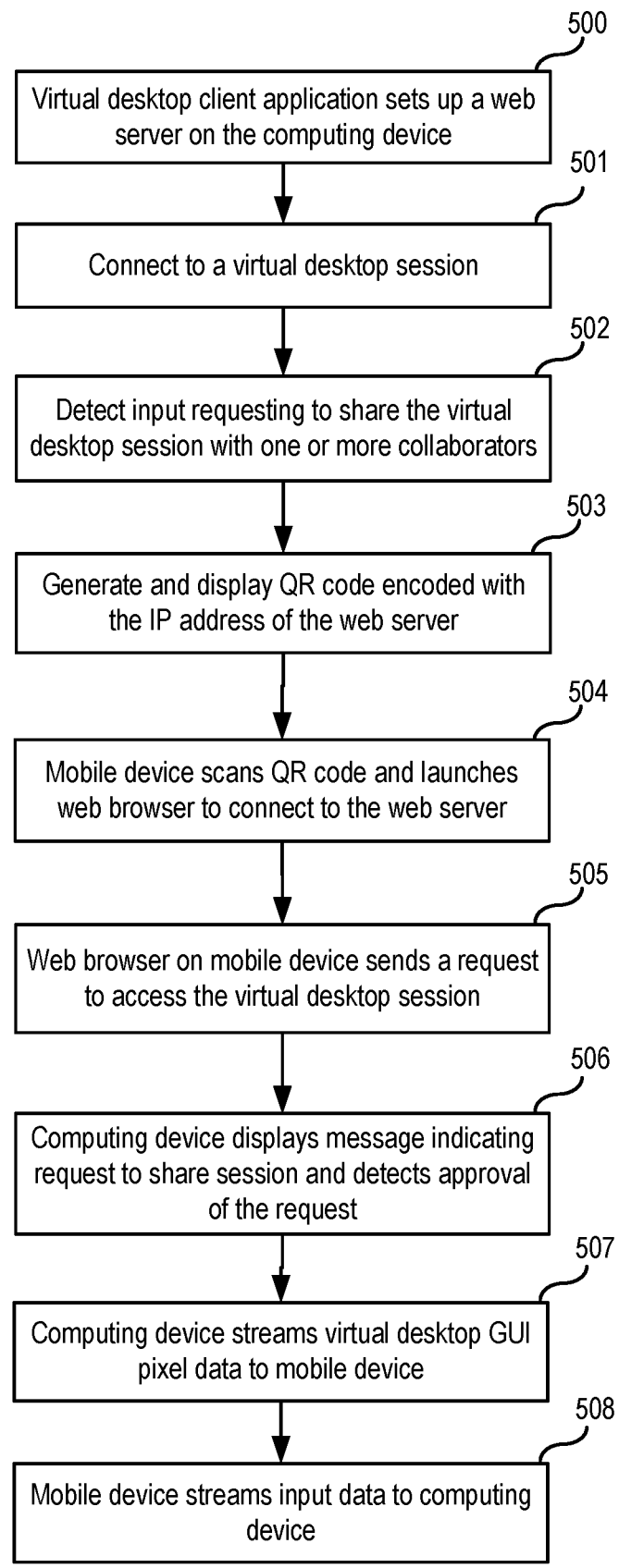
FIG. 5 illustrates an example of a process flow for enabling virtual desktop sharing and collaboration, in accordance with various embodiments.

FIG. 5 illustrates an example of a process flow for enabling virtual desktop sharing and collaboration, in accordance with various embodiments. As shown in operation 500, the process begins by the virtual desktop client application establishing the web server on the client computing device. In operation 501, the virtual desktop client application connects to the virtual desktop session. In operation 502, the virtual desktop client application detects input requesting to share the current virtual desktop session with one or more collaborators. In operation 503, the virtual desktop client application generates a QR code (or similar encoded image) and displays the QR code on the display screen of the client computing device. The QR code is encoded with the IP address and/or other information identifying the web server established on the client computing device. In operation 504, a collaborator's mobile device scans the QR code and launches a web browser. The web browser connects to the web server operating on the client computing device and executes a web application provided by the web server. In operation 505, the web application executing inside the web browser sends a request to access the virtual desktop session to the web server operating on the client computing device. In operation 506, the client computing device displays a message with information identifying the device and user requesting access to the virtual desktop session. The client computing device then detects input indicating approval of the request to access the virtual desktop session. In operation 507, the client computing device begins to stream the virtual desktop GUI pixel data to the collaborator's mobile device. In operation 508, the mobile device streams input data to the client computing device.

Figure 6:
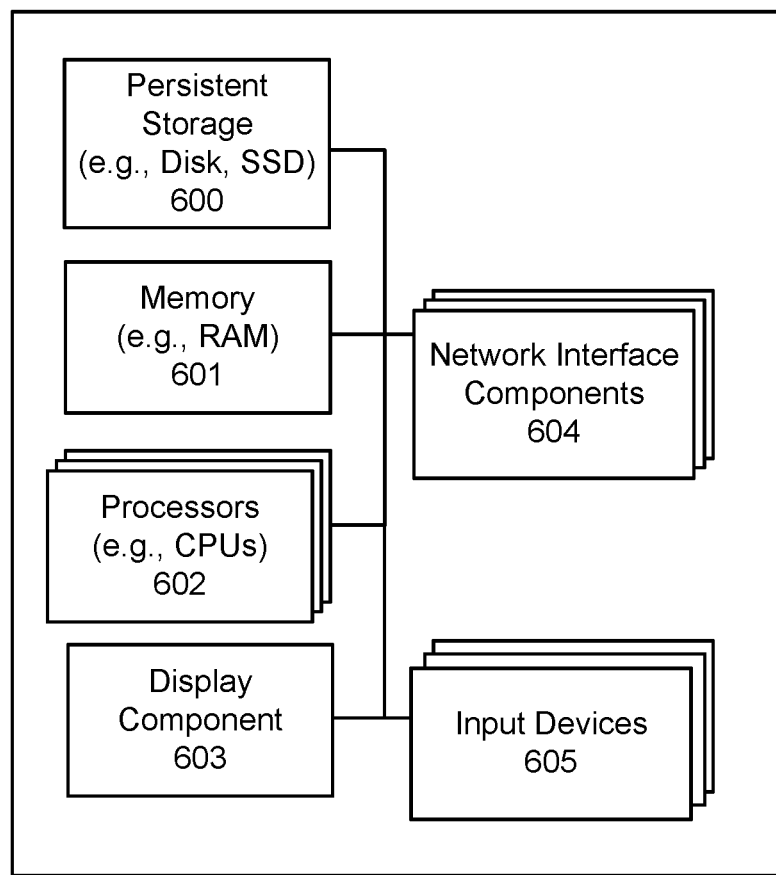
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for sharing a virtual desktop session via image scanning, the method comprising:
   installing a virtual desktop client on a client computing device, the virtual desktop client configured to access a virtual desktop session with a virtual desktop hosted on a remote server over a network connection;
   establishing a web server on the client computing device by the virtual desktop client, wherein the web server is configured to provide a web application for sharing the virtual desktop session with other devices;
   detecting input indicating that the virtual desktop session is to be shared;
   displaying a Quick Response (QR) code on the client computing device by the virtual desktop client, wherein the QR code is encoded with information identifying the web server established by the virtual desktop client on the client computing device;
   receiving a request from a mobile device to access the virtual desktop session, wherein the request is transmitted by a web application that is launched on the web browser of the mobile device in response to the mobile device scanning the QR code displayed by the virtual desktop client; and
   streaming pixel data of a graphical user interface (GUI) of the virtual desktop session received by the client computing device from the remote server to the mobile device over a web connection established between the web browser of the mobile device and the web server operating on the client computing device.

2. The method of claim 1, wherein receiving the request from the mobile device to access the virtual desktop session further comprises:
   displaying a message on the client computing device notifying of the request to access the virtual desktop session along with identification information of at least one of the mobile device or a user of the mobile device; and receiving input on the client computing device indicating that the request to access the virtual desktop session by the mobile device is approved before starting to stream the pixel data to the mobile device.

3. The method of claim 1, further comprising:

receiving input data captured on the mobile device from the web browser of the mobile device, the input data including at least one of touch input, keyboard or mouse events; and transmitting the input data by the virtual desktop client to the virtual desktop hosted on the remote server.

4. The method of claim 1, wherein the pixel data of the GUI of the virtual desktop session is displayed on a display screen of the mobile device by the web application executing in the web browser of the mobile device.

5. The method of claim 1, further comprising:

receiving a request to terminate sharing the virtual desktop session from either the mobile device or the client computing device; and discontinuing the streaming of the pixel data to the mobile device.

6. The method of claim 1, further comprising:

receiving audio data from the virtual desktop session to the computing device by the virtual desktop client; and streaming the received audio data to the mobile device over the web connection established between the web browser of the mobile device and the web server operating on the client computing device.

7. The method of claim 1, wherein the QR code contains a one-time token that makes the QR code unavailable for future connections after the web connection is established between the web browser of the mobile device and the web server operating on the client computing device.

8. A computing system, comprising:

at least one processor; and memory including instructions that, when executed by the at least one processor, cause the computing system to perform the steps of:

installing a virtual desktop client on a client computing device, the virtual desktop client configured to access a virtual desktop session with a virtual desktop hosted on a remote server over a network connection;

establishing a web server on the client computing device by the virtual desktop client, wherein the web server is configured to provide a web application for sharing the virtual desktop session with other devices;

detecting input indicating that the virtual desktop session is to be shared;

displaying a Quick Response (QR) code on the client computing device by the virtual desktop client, wherein the QR code is encoded with information identifying the web server established by the virtual desktop client on the client computing device;

receiving a request from a mobile device to access the virtual desktop session, wherein the request is transmitted by a web application that is launched on the web browser of the mobile device in response to the mobile device scanning the QR code displayed by the virtual desktop client; and streaming pixel data of a graphical user interface (GUI) of the virtual desktop session received by the client computing device from the remote server to the mobile device over a web connection established between the web browser of the mobile device and the web server operating on the client computing device.

9. The computing system of claim 8, wherein receiving the request from the mobile device to access the virtual desktop session further comprises:

displaying a message on the client computing device notifying of the request to access the virtual desktop session along with identification information of at least one of the mobile device or a user of the mobile device; and receiving input on the client computing device indicating that the request to access the virtual desktop session by the mobile device is approved before starting to stream the pixel data to the mobile device.

10. The computing system of claim 8, wherein the memory further includes instructions that when executed by the at least one processor, cause the computing system to perform the steps of:

receiving input data captured on the mobile device from the web browser of the mobile device, the input data including at least one of touch input, keyboard or mouse events; and transmitting the input data by the virtual desktop client to the virtual desktop hosted on the remote server.

11. The computing system of claim 8, wherein the pixel data of the GUI of the virtual desktop session is displayed on a display screen of the mobile device by the web application executing in the web browser of the mobile device.

12. The computing system of claim 8, wherein the memory further includes instructions that when executed by the at least one processor, cause the computing system to perform the steps of:

receiving a request to terminate sharing the virtual desktop session from either the mobile device or the client computing device; and discontinuing the streaming of the pixel data to the mobile device.

13. The computing system of claim 8, wherein the memory further includes instructions that when executed by the at least one processor, cause the computing system to perform the steps of:

receiving audio data from the virtual desktop session to the client computing device by the virtual desktop client; and streaming the received audio data to the mobile device over the web connection established between the web browser of the mobile device and the web server operating on the client computing device.

14. The computing system of claim 8, wherein the QR code contains a one-time token that makes the QR code unavailable for future connections after the web connection is established between the web browser of the mobile device and the web server operating on the client computing device.

15. A non-transitory computer readable storage medium comprising one or more sequences of instructions, the instructions when executed by one or more processors causing the one or more processors to execute the operations of:

installing a virtual desktop client on a client computing device, the virtual desktop client configured to access a virtual desktop session with a virtual desktop hosted on a remote server over a network connection;

establishing a web server on the client computing device by the virtual desktop client, wherein the web server is configured to provide a web application for sharing the virtual desktop session with other devices;

detecting input indicating that the virtual desktop session is to be shared;

displaying a Quick Response (QR) code on the client computing device by the virtual desktop client, wherein the QR code is encoded with information identifying the web server established by the virtual desktop client on the client computing device;

receiving a request from a mobile device to access the virtual desktop session, wherein the request is transmitted by a web application that is launched on the web browser of the mobile device in response to the mobile device scanning the QR code displayed by the virtual desktop client; and streaming pixel data of a graphical user interface (GUI) of the virtual desktop session received by the client computing device from the remote server to the mobile device over a web connection established between the web browser of the mobile device and the web server operating on the client computing device.

16. The non-transitory computer readable storage medium of claim 15, wherein receiving the request from the mobile device to access the virtual desktop session further comprises:

displaying a message on the client computing device notifying of the request to access the virtual desktop session along with identification information of at least one of the mobile device or a user of the mobile device; and receiving input on the client computing device indicating that the request to access the virtual desktop session by the mobile device is approved before starting to stream the pixel data to the mobile device.

17. The non-transitory computer readable storage medium of claim 15, further comprising instructions that when executed by the one or more processors cause the one or more processors to execute the operations of:

receiving input data captured on the mobile device from the web browser of the mobile device, the input data including at least one of touch input, keyboard or mouse events; and transmitting the input data by the virtual desktop client to the virtual desktop hosted on the remote server.

18. The non-transitory computer readable storage medium of claim 15, wherein the pixel data of the GUI of the virtual desktop session is displayed on a display screen of the mobile device by the web application executing in the web browser of the mobile device.

19. The non-transitory computer readable storage medium of claim 15, further comprising instructions that when executed by the one or more processors cause the one or more processors to execute the operations of:

receiving a request to terminate sharing the virtual desktop session from either the mobile device or the client computing device; and discontinuing the streaming of the pixel data to the mobile device.

20. The non-transitory computer readable storage medium of claim 15, further comprising instructions that when executed by the one or more processors cause the one or more processors to execute the operations of:

receiving audio data from the virtual desktop session to the client computing device by the virtual desktop client; and streaming the received audio data to the mobile device over the web connection established between the web browser of the mobile device and the web server operating on the client computing device.

* * * * *